(12) United States Patent
Krähenbühl et al.

(10) Patent No.: US 7,255,489 B2
(45) Date of Patent: Aug. 14, 2007

(54) CONNECTOR DEVICE FOR THE DETACHABLE CONNECTION OF AT LEAST ONE LIGHT WAVE GUIDE TO AT LEAST ONE OPTOELECTRONIC COMPONENT AND METHOD FOR ASSEMBLY OF SUCH A CONNECTOR DEVICE

(75) Inventors: Roger Krähenbühl, Herisau (CH); Jörg Kühne, Pfäffikon (CH)

(73) Assignee: Huber+Suhner AG, Herisau (CH)

( * ) Notice: Subject to any disclaimer, the term of this patent is extended or adjusted under 35 U.S.C. 154(b) by 0 days.

(21) Appl. No.: 10/528,953

(22) PCT Filed: Jul. 8, 2003

(86) PCT No.: PCT/CH03/00452

§ 371 (c)(1), (2), (4) Date: Mar. 22, 2005

(87) PCT Pub. No.: WO2004/027482

PCT Pub. Date: Apr. 1, 2004

(65) Prior Publication Data

US 2005/0259924 A1    Nov. 24, 2005

(30) Foreign Application Priority Data

Sep. 23, 2002    (CH) .................................. 1602/02

(51) Int. Cl.
G02B 6/36    (2006.01)

(52) U.S. Cl. .......................... 385/88; 385/92; 385/93

(58) Field of Classification Search ................ 385/88
See application file for complete search history.

(56) References Cited

U.S. PATENT DOCUMENTS

| 4,461,537 A | 7/1984 | Raymer et al. |
| 5,042,891 A | 8/1991 | Mulholland et al. |
| 5,108,167 A * | 4/1992 | Kandpal et al. ............. 385/33 |
| 5,243,678 A | 9/1993 | Schaffer et al. |
| 5,481,634 A | 1/1996 | Anderson et al. |
| 5,546,490 A | 8/1996 | Kihara et al. |
| 5,684,903 A * | 11/1997 | Kyomasu et al. ............ 385/93 |
| 5,692,083 A | 11/1997 | Bennett |

(Continued)

FOREIGN PATENT DOCUMENTS

DE    199 10 163 A1    9/2000

(Continued)

*Primary Examiner*—Sung Pak
(74) *Attorney, Agent, or Firm*—The Webb Law Firm

(57) ABSTRACT

The invention relates to a connector for the detachable connection of at least one light waveguide to at least one optoelectronic component, which is arranged and electrically contacted as a chip directly to the surface of a support or a circuit board and which has an optical axis perpendicular to the support or circuit board. The light waveguide is provided with a fiber-optic plug connector at the end thereof for connection. The connector includes a base piece fixed to the surface of the support or circuit board, enclosing the optoelectronic component and includes a through-hole for the optical signal for exchange between the optical component and the light waveguide. The connector device also includes a coupling piece which connects to the base piece facing outwards and which comprises a socket opening for plugging in the standardized fiber optic plug connector.

19 Claims, 6 Drawing Sheets

U.S. PATENT DOCUMENTS

| | | |
|---|---|---|
| 5,708,743 A * | 1/1998 | DeAndrea et al. ............ 385/88 |
| 5,751,878 A | 5/1998 | Kyoya |
| 6,071,017 A | 6/2000 | Gilliland et al. |
| 6,287,016 B1 | 9/2001 | Weigel |
| 6,409,398 B2 | 6/2002 | Nakaya et al. |

FOREIGN PATENT DOCUMENTS

| | | |
|---|---|---|
| EP | 0 938 006 A1 | 8/1999 |
| EP | 1 113 300 A1 | 7/2001 |

* cited by examiner

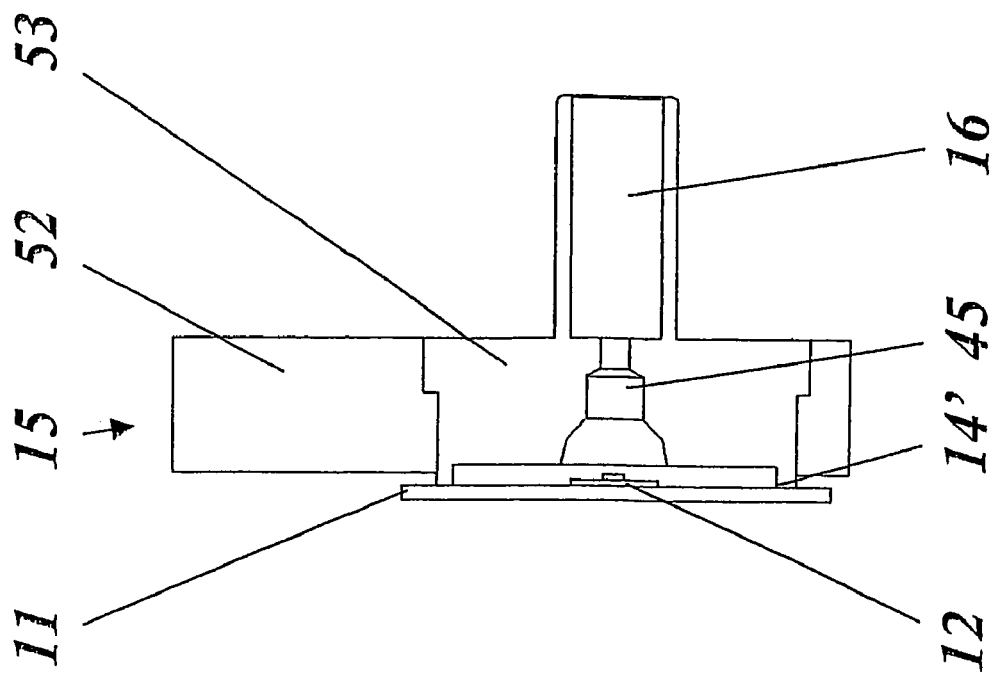
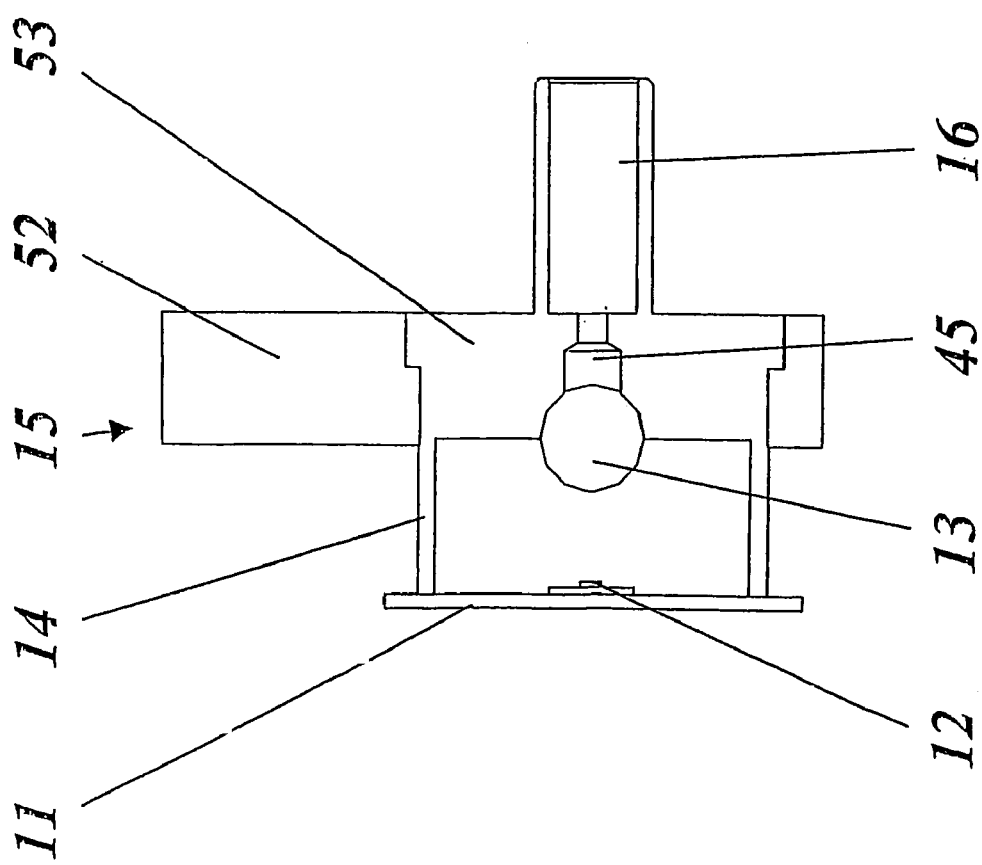

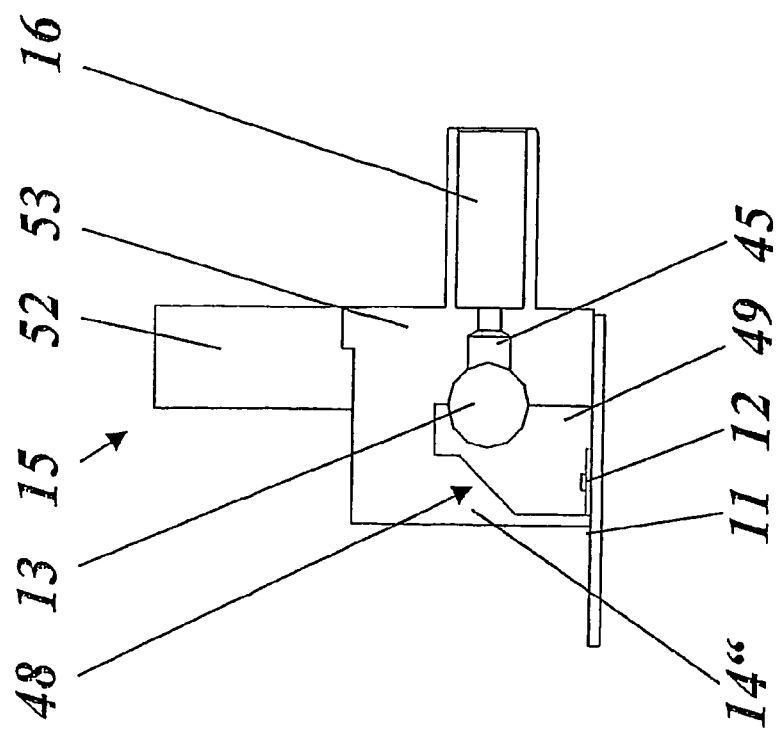
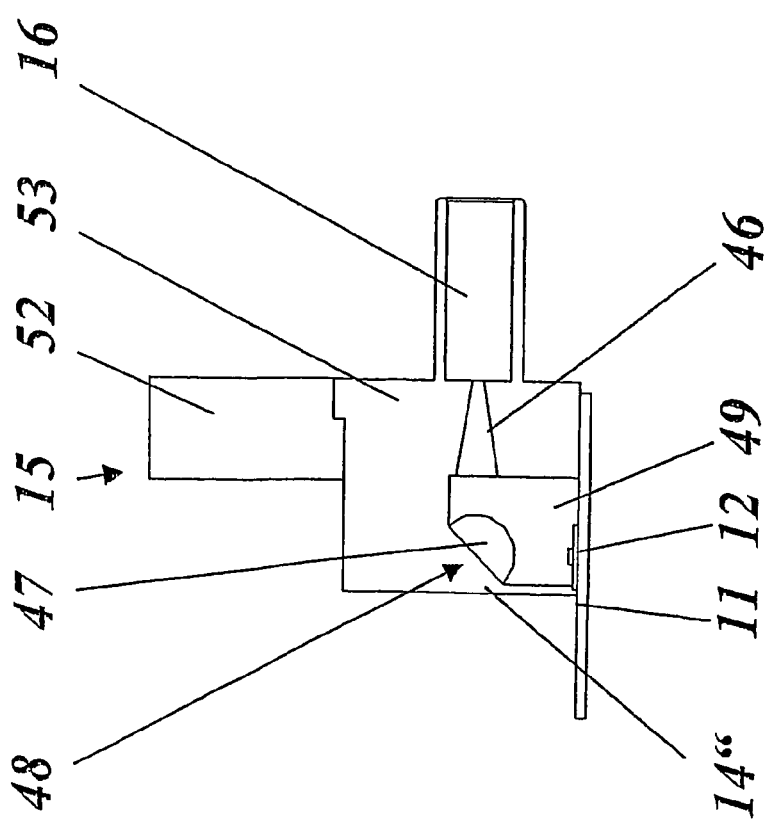
Fig. 7
Fig. 6

CONNECTOR DEVICE FOR THE DETACHABLE CONNECTION OF AT LEAST ONE LIGHT WAVE GUIDE TO AT LEAST ONE OPTOELECTRONIC COMPONENT AND METHOD FOR ASSEMBLY OF SUCH A CONNECTOR DEVICE

BACKGROUND OF THE INVENTION

1. Field of the Invention

The present invention relates to the field of optical connection technology. It concerns a connector device for the detachable connection of at least one optical waveguide to at least one optoelectronic component and a method for the assembly of such a connector device.

2. Description of Related Art

For the connection between circuit parts or system parts of complex electronic systems for data transmission and processing, optical connections are increasingly being used, because on the one hand they permit extremely high data transmission rates or bandwidths and on the other hand they are insensitive to electromagnetic influences. For the setting up of connections of this type, optoelectronic transmitting and/or receiving elements, such as LEDs, laser diodes, photodiodes, phototransistors and the like, which convert electrical pulses into optical pulses or convert optical pulses back into electrical pulses and are connected to one another by corresponding optical waveguides, must be provided in the circuit parts to be connected. The optical connections are advantageously intended here to be of a plug-in type, in order to facilitate assembly and maintenance. Required for this purpose are so-called "receptacles", which are mechanically connected to the optoelectronic components or the printed circuit boards (PCBs) carrying them or comparable supports, and which permit optically adjusted insertion of an optical waveguide plug.

In the past, many solution proposals for connections of this type have been made, mainly based on the idea that the optoelectronic component to be connected is accommodated in a separate housing (for example a metallic TO package or a molded-on plastic housing) and can be soldered to a printed circuit board by electrical connections led out from the housing.

Examples of such connector devices in which the components are accommodated in TO packages are described in U.S. Pat. No. 5,546,490 or U.S. Pat. No. 5,751,878 or U.S. Pat. No. 5,042,891. A modification of these solutions which dispenses with the cap of the component housing is disclosed in U.S. Pat. No. 6,409,398.

Examples of connector devices which are based on optoelectronic components encapsulated with plastic are known from U.S. Pat. No. 4,461,537 or U.S. Pat. No. 5,243,678 (in duplex arrangement) or EP-A1-0 938 006 or EP-A1-1 113 300.

Another solution (U.S. Pat. No. 5,692,083) proposes a one-part connector device with an integrated lens which at one end receives the component arranged on a ceramic plate and at the other end has a drilled hole for the insertion of a ferrule.

Disclosed in DE-A1-199 10 163 is an optical connector in which an attachment onto which the plug of an optical waveguide can be laterally fitted is placed on the actual active optoelectronic module and fixed.

All the solutions from the prior art are based on optoelectronic components that are formed as components which can be independently connected to a housing or a supporting base plate and therefore take up a comparatively large amount of space. With increasing miniaturization of the electronic circuits and increasing packing density in the systems, however, a change is taking place in favor of placing optoelectronic components in the form of chips directly on the respective circuit board and connecting them.

An example of such a component in chip form is a multimode VCSEL chip (VCSEL=Vertical Cavity Surface Emitting Laser) of the AP850 type from Avalon Photonics, Zurich, Switzerland designed for the 850 nm wavelength. Such a chip component has external dimensions in the millimeter range and an active surface in the micrometer range.

A connector device for components in chip form arranged directly on the circuit board has been described in various embodiments in U.S. Pat. No. 6,071,017. One embodiment (FIG. 1, 2) has two coaxial sockets, the inner one of which carries an optical element, while the outer one is intended for receiving the ferrule with the optical waveguide. Both sockets must be labouriously adjusted appropriately and separately fixed on the circuit board. Other embodiments (FIGS. 6, 8, 9) are based on a one-piece housing with built-in lens and molded-in ferrule holder. A disadvantage of all these proposals is that receptacles and plug connectors that represent special solutions are specified for the components, so that none of the standardized optical plug connectors (for example of the LC or LX.5 type or the like) can be used for the optical connection.

SUMMARY OF THE INVENTION

It is therefore the object of the invention to create for optoelectronic components in chip form placed on a support or a circuit board a connector device for a detachable connection to an optical waveguide which is of a simple and space-saving construction, is easy to adjust and can be adapted in a modular and flexible manner to different standardized optical plug connector systems, and also to provide a method for the assembly of such a connector device.

The connector device comprises a base part which is independent of the respective plug connector system, is fastened on the surface of the support or the circuit board and surrounds the optoelectronic component, and that the connector device also comprises a coupling part which is made to match the respective plug connector system, connects to the base part facing outward and is fastened to the base part, and has an insertion opening for the insertion of the standardized fiber-optic plug connector.

A first preferred configuration of the connector device according to the invention is characterized in that the base part comprises a preferably rectangular plate which extends transversely to the direction of insertion of the fiber-optic plug connector, can be connected on one side to the coupling part and has on the other side an adapter with which the base part can be placed onto the support or the circuit board, in that the standardized fiber-optic plug connector has a ferrule in which the optical waveguide ends, in that, for receiving the ferrule when the plug connector is inserted on the base part, a ferrule holder into which the drilled through-hole in the base part opens out is provided on the side of the plate opposite from the adapter, in that the ferrule holder protrudes into the coupling part, and in that the adapter and the ferrule holder are part of a one-piece insert which is inserted into the plate of the base part, the drilled through-hole inside the insert running between the adapter and the ferrule holder. Combining the adapter and the ferrule holder in an insert makes the adjustment of the connector device particularly simple. The plate of the base part, which is firmly connected to the insert and the dimensions of which are largely freely selectable, permits optimum adaptation to the coupling part necessary for the respective standard plug connector.

The insert is preferably produced from a metal, and the plate is preferably produced from a plastic. The insert and the plate may, however, also be united in a one-piece element and be produced from a plastic.

It is particularly favorable for the optical connection if, according to another configuration of the invention, means for focusing light rays passing between the optoelectronic component and the optical waveguide are arranged in the insert, the focusing means either comprising a lens which is arranged at the entry of the drilled through-hole, or comprising a focusing reflective surface.

If the connection to the component is intended to take place vertically from above, the plate of the base part is arranged parallel to the support or the circuit board; the drilled through-hole and the insertion opening in this case run in the direction of the optical axis of the optoelectronic component. The adapter is then preferably formed in a hollow-cylindrical manner.

If the connection to the component is intended to take place parallel to the plane of the support or the circuit board, the plate of the base part is arranged perpendicular to the support or the circuit board; the drilled through-hole and the insertion opening then run parallel to the support or the circuit board, and means for the orthogonal deflection of the light rays passing between the optoelectronic component and the optical waveguide are provided in the adapter. The deflecting means may in this case comprise either a hemispherical lens, a planar reflective surface or a focusing reflective surface.

DESCRIPTION OF THE DRAWINGS

The invention is to be explained in more detail below on the basis of exemplary embodiments in conjunction with the drawing, in which:

FIG. 4 shows a section through the base part according to FIGS. 1-3 in the state in which it is placed on the circuit board;

FIG. 5 shows a section through the base part comparable to FIG. 4 with a shortened adapter and without a spherical lens;

FIG. 6 shows a section through a base part with 90° deflection by means of a hemispherical focusing lens as a deflecting mirror;

FIG. 7 shows a section through a base part comparable to FIG. 6 with a focusing lens that is separate from the deflecting mirror.

DETAILED DESCRIPTION OF THE INVENTION

Figure 1:
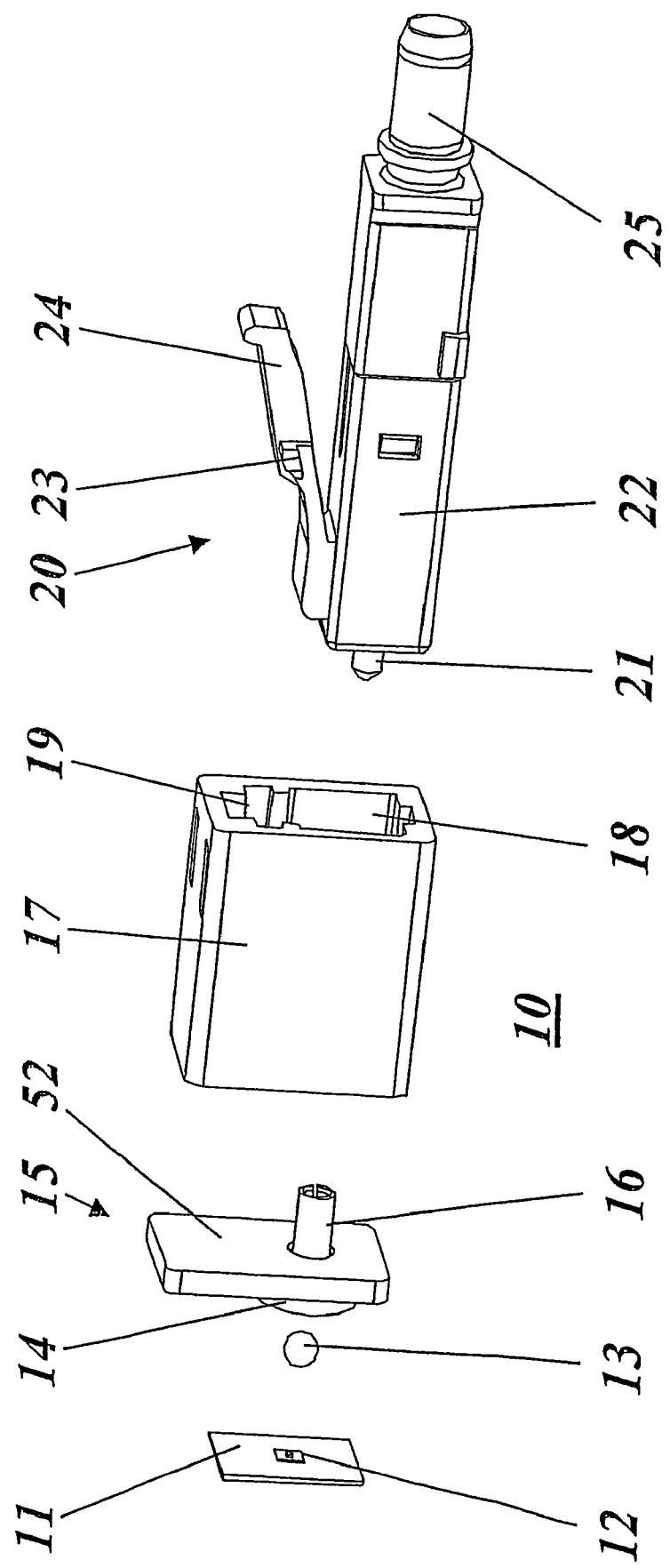
FIG. 1 shows in a perspective exploded representation the various parts of a connector device according to a first preferred exemplary embodiment of the invention for the detachable connection of an LC plug connector to an optoelectronic, in particular VCSEL, element.

In FIG. 1, the various parts of a connector device according to a first preferred exemplary embodiment of the invention are represented in a perspective exploded representation along the optical axis of the plug connection. The connector device 10 serves for the pluggable connection of an optical waveguide or optical cable provided with a fiber-optic plug connector 20 to an optoelectronic component 12, which in this specific example is formed as a VCSEL (Vertical Cavity Surface Emitting Laser) and is located as a chip directly on a circuit board 11, which may be either an independent platform of a small area for the component 12 or part of a circuit board of a larger area. Instead of a VCSEL chip, it goes without saying that other optoelectronic components in chip form, such as photodiodes, phototransistors, LEDs or different types of semiconductor lasers for example, may be provided within the scope of the invention.

The fiber-optic plug connector 20 is in this example a standardized LC plug connector which is described in detail in U.S. Pat. No. 5,481,634 and, with a diameter of the ferrule 21 of only 1.25 mm and external dimensions (a "footprint") of 4.6 mm×4.6 mm, permits a high connector density. It is, however, also conceivable to design the connector device of the invention for other known types of connector with a larger footprint, such as plug connectors of the SC, ST or FC type for example. However, the achievable connection density is then lower.

The plug connector 20 has a two-part housing 22 from which a sleeve 25 protrudes at the cable end for the pushing-on of an anti-kink grommet. Attached on the upper side of the housing 22 is a locking device, which comprises a flexible actuating lever 24 extending obliquely to the rear from the housing 22 and in the central region of which laterally protruding latching elements 23 are molded on. If the plug connector 20 is inserted into a corresponding insertion opening of a coupling, the latching elements 23 latch behind a latching edge provided in the coupling, so that the plug connector 20 cannot be unwantedly pulled out from the coupling by a pull on the cable. For unlocking, the actuating lever 24 is pressed in the direction of the housing 22, until the latching elements 23 come free from the latching edge, and the plug connector 20 is then pulled out with the actuating lever 24 pressed.

The coupling for the plug connector 20 is formed by a substantially cuboidal, internally hollow coupling part 17, which has in the lower region an insertion opening 18 for the plug connector with corresponding guiding elements, and above the insertion opening 18 a latching device 19, which comprises lateral guiding grooves running in the longitudinal direction for the latching elements 23 and transversely lying latching edges (not visible in FIG. 1).

The coupling part 17 only receives the housing 22 of the plug connector 20 and the latching elements 23. However, the actual optical connection is brought about by means of the ferrule 21 of the plug connector 20, in the central drilled hole of which the optical waveguide of the optical cable ends. Provided for receiving and guiding the ferrule 21 is a longitudinally slit ferrule holder ("sleeve") 16, which is arranged on a separate base part 15.

The construction of the base part 15 from FIG. 1 is evident from the sectional representation in FIG. 4. The base part 15 comprises a substantially rectangular plate 52, which extends transversely to the direction of insertion and the external dimensions of which are adapted to the cross-sectional dimensions of the coupling part 17. Fitted into an opening in the plate 52 transversely to the plane of the plate is an insert 53, which protrudes with the ferrule holder 16 beyond the plate 52 on the side facing toward the plug connector 20. On the side facing away from the plug connector 20, the insert goes over into a hollow-cylindrically formed adapter 14. As is evident from FIG. 4, the base part 15 is placed with the annular edge of the adapter 14 onto the circuit board 11, which on its upper side carries the optoelectronic component 12 to be connected. The plate 52—as well as the coupling part 17—preferably consists of a suitable plastic, the insert 53 preferably consists of a metal.

Provided inside the insert 53 is a central drilled through-hole 45, which runs in the direction of insertion and connects the inner space enclosed by the ferrule holder 16 to the inner space enclosed by the adapter 14. Through the drilled through-hole 45, light can be exchanged between the optoelectronic component 12 and the optical waveguide surrounded by the ferrule 21 of the inserted plug connector 20. If the component 12 is a light-emitting component, such as a laser of the VCSEL type for example, and the distance between the light source and the end of the optical waveguide is comparatively large on account of the length of the adapter 14, it is of advantage to provide a focusing optical element between the component 12 and the entry of the optical waveguide in a way known per se. In the exemplary embodiment of FIGS. 1 and 4, the focusing element is a spherical lens 13, which is arranged inside the insert 53 at the entry of the drilled through-hole 45 on the component side. However, it is also conceivable—as is shown in FIG. 5—to omit the focusing lens, if instead of the "long" adapter 14 a much shorter adapter 14' is used.

The subdivision of the connector device 10 into a base part 15 and a coupling part 17 has major advantages: the base part 15 receives the ferrule 21 of the plug connector 20 with the cemented-in end of the optical waveguide and is consequently directly responsible for the optical connection between the optical waveguide and the optoelectronic component 12. Also accommodated in the base part 15 are the additional optical devices for the focusing (for example lenses) and, if appropriate, deflection of the rays (for example mirrors). The base part 15 is therefore the "optical" part of the connector device 10 and must accordingly be adjusted to the optical center of the component 12. The coupling part 17, on the other hand, is exclusively responsible for the mechanical tasks associated with the plug connection, in particular the mechanically stable guidance and locking of the plug connector and, if appropriate, coding. The base part 15 can in this case be adapted largely independently to the particular characteristics of the respective component 12, while the coupling part 17 is made to match the respective type of plug connector in its configuration. The common connecting element for all connector devices is the plate 52 of the base part 15, which serves for the connection of the base part 15 to the coupling part 17, and which is expediently chosen to be the same for all types of connector devices.

Figure 2:
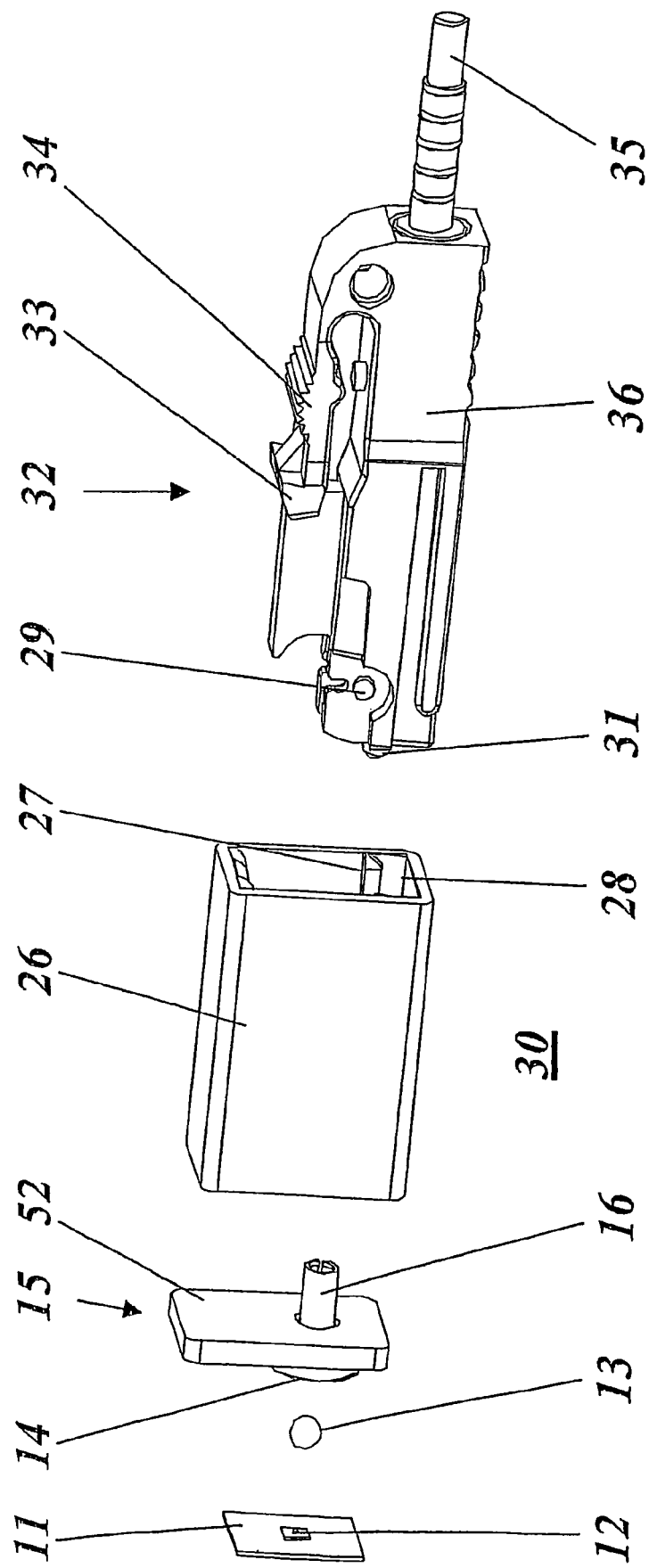
FIG. 2 shows in a representation comparable to FIG. 1 a second preferred exemplary embodiment of the connector device according to the invention for the detachable connection of an LX.5 plug connector to an optoelectronic, in particular VCSEL, element.
Figure 3:
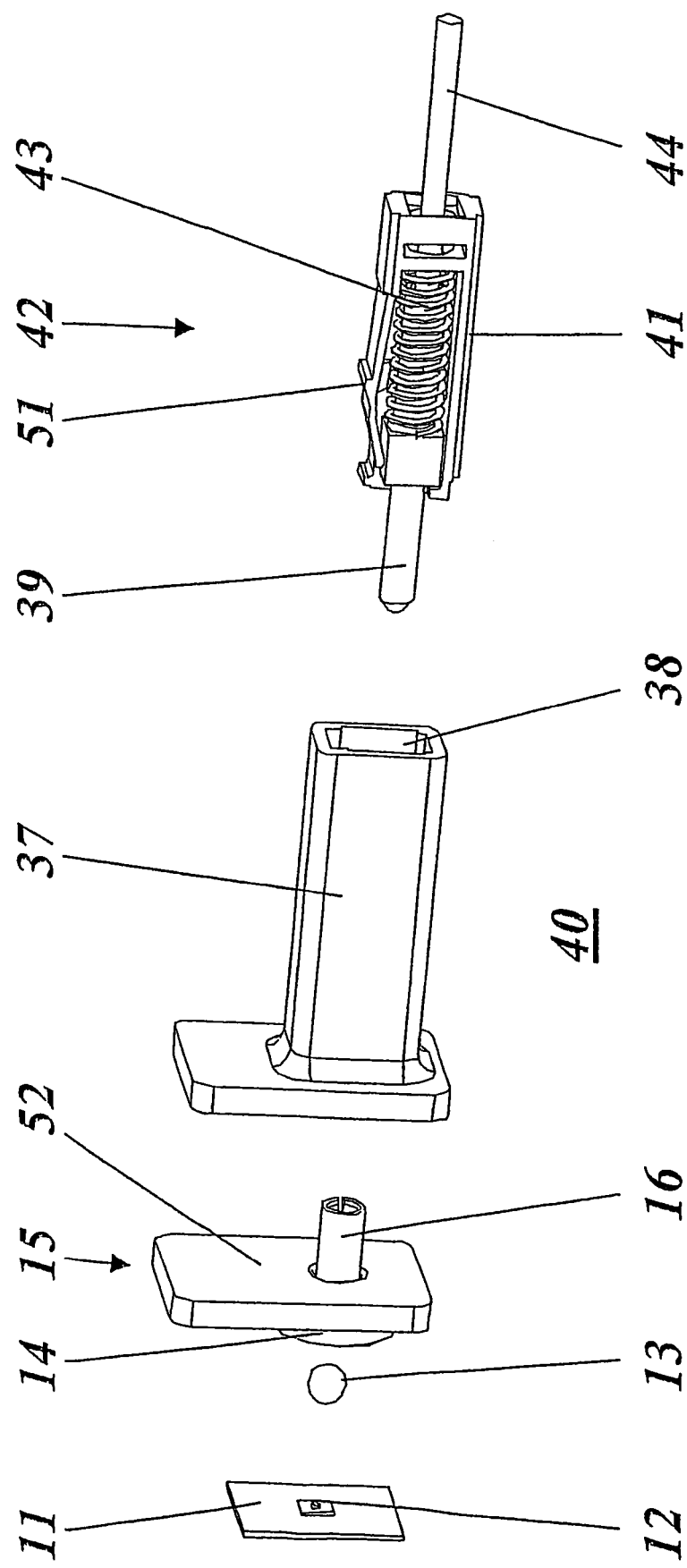
FIG. 3 shows in a representation comparable to FIG. 1 a third preferred exemplary embodiment of the connector device according to the invention for the detachable connection of a miniaturized plug connector according to WO-A1-01/59499 to an optoelectronic, in particular VCSEL, element.

These characteristics of the solution according to the invention become particularly clear if the connector devices 10, 30 and 40 from FIGS. 1, 2 and 3 are compared to one another, differing only in that a different type of connector is used in each case for the optical connection to the same optoelectronic component 12: while in the exemplary embodiment of FIG. 1 the plug connector 20 is of the LC plug type, in the exemplary embodiment of FIG. 2 a fiber-optic plug connector 32 of the LX.5 type from the US company ADC Communications, Inc. is used. Such a plug connector, which—in the same way as the LC plugs—is distinguished by a high achievable connector density, is described for example in U.S. Pat. No. 6,142,676. The plug connector 32 of FIG. 2 likewise has an elongate plastic housing 36 from which a ferrule 31 (likewise with the diameter 1.25 mm) protrudes at the front, while a sleeve 35 for the fitting on of an anti-kink grommet in turn protrudes to the rear. In this case, too, an elastically pivotable actuating lever 34, which is provided at its free end with latching elements 33, is molded on the upper side of the housing 36. The special feature of the LX.5 plug connector 32 in comparison with the LC plug connector 20 is that the end face with the ferrule 31 can be covered by a protective flap (not represented in FIG. 2), which can be pivoted by approximately 90° about a pivot axis 29. This protective flap opens automatically when the plug connector 32 is inserted into the insertion opening 28 of a correspondingly designed coupling part 26.

The coupling part 26 has the same external dimensions as the coupling part 17 in FIG. 1, and can therefore be connected to the same type of base part 15. In the interior of the coupling part 26, however, the guiding rails 27 for guiding the housing 36 of the plug connector 32 are adapted to the special configuration of the plug connector 32. This similarly applies to the latching edges (which cannot be seen), which interact with the latching elements 33 on the actuating lever 34.

In the exemplary embodiment of FIG. 3, with the base part 15 remaining the same, a fiber-optic plug connector 42 which takes up even less space than the plug connectors 20 and 32 from FIGS. 1 and 2 is used. The plug connector 42, which has been developed by the applicant and is described in detail in WO-A1-01/59499, dispenses with a closed housing in favor of a narrow, frame-like, laterally open housing 41, in which the ferrule 39 (with the diameter 1.25 mm) is mounted such that it can spring back by means of a compression spring 43. On the side opposite from the ferrule 39, the fiber-optic cable 44 with the optical waveguide is led out. On the upper side of the housing 41, here, too, a latching element 51 by means of which the plug connector 42 can be inserted into the associated coupling in a latching-in manner is arranged on an elastically bendable tongue. Since this plug connector 42, reduced to the minimum necessary, is extremely small and space-saving, the associated coupling part 37 is correspondingly reduced in the external dimensions over virtually the entire length and only at the end remote from the plug widens into a plate which is adapted in size to the plate 52 of the base part 15. In this way, the base part 15 and the coupling part 37 can be connected to each other (for example adhesively bonded) without difficulties and with maximum mechanical stability. In this example, too, the insertion opening 38 of the coupling part 37 is adapted to the outer contour of the plug connector 42 and contains in the interior corresponding latching edges for the latching element 51.

It is directly evident from the comparison of the three exemplary embodiments of FIGS. 1, 2 and 3 that, when there is a change in the type of plug connector, only the coupling part changes, i.e. is adapted to the type of connector, while the base part remains unchanged. In this way, a system of connector devices that can be adapted in a modular manner to different circumstances in a very flexible way can be provided.

Figure 8:
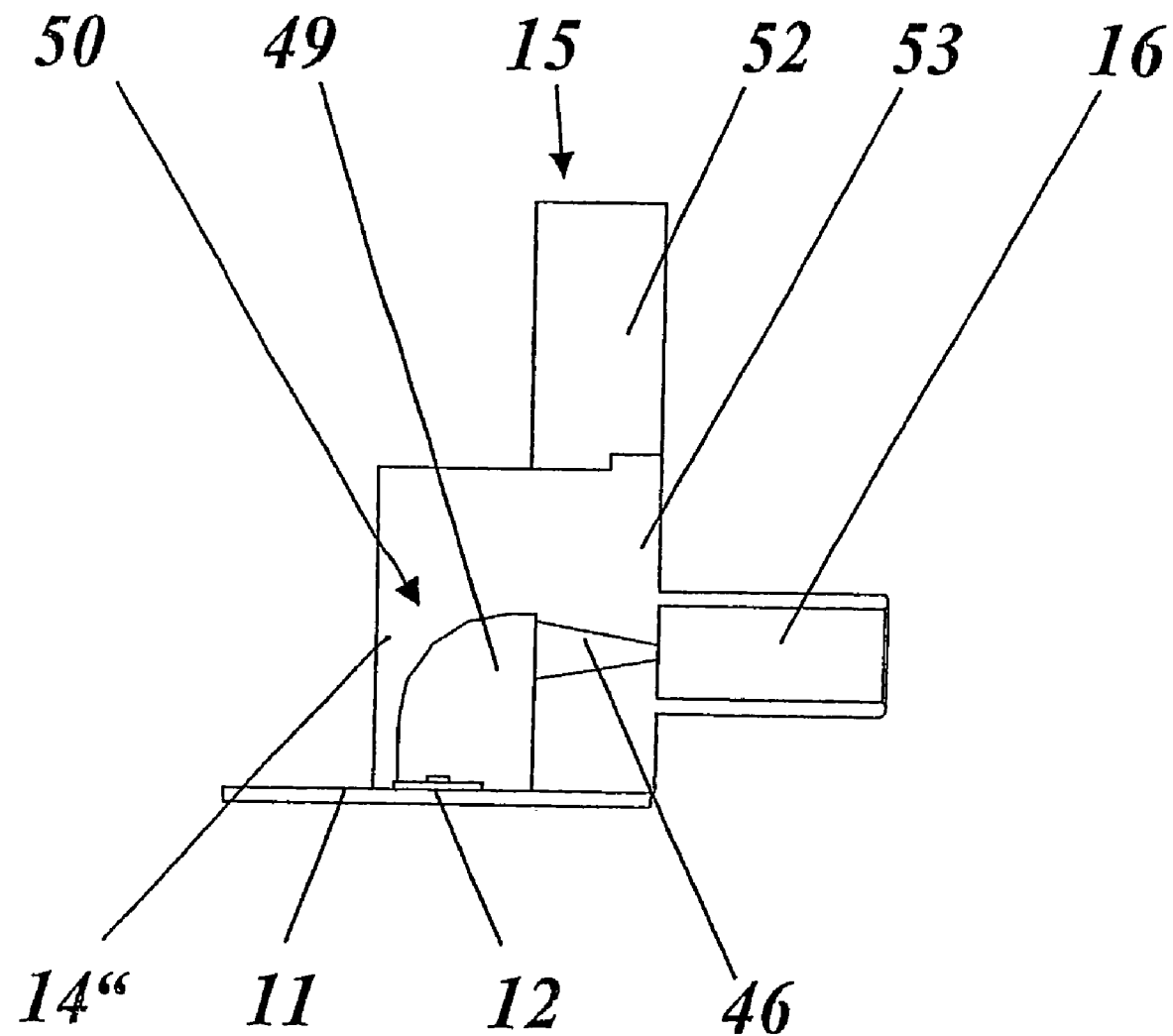
FIG. 8 shows a section through a base part comparable to FIG. 6 with a combined deflecting and focusing mirror.

A change in the base part 15 is necessary whenever the direction of insertion of the plug connector 20, 32 or 42, which coincides with the optical axis of the plug connector, is not to be oriented parallel to the optical axis of the optoelectronic component 12, but perpendicular thereto, that is to say whenever the plug connector 20, 32, 42 is intended to be able to be inserted parallel to the circuit board 11. The change is in this case performed only on the insert 53 of the base part 15, as is shown by way of example in FIGS. 6, 7 and 8. While the plate 52 and the position of the ferrule holder 16 in relation to the plate 52 of the base part 15 remains virtually unchanged, the adapter 14" on the insert 53 is configured in such a way that it surrounds the optoelectronic component 12 on the circuit board 11 with a deflecting space 49, which opens outward transversely to the drilled through-hole 45 or 46. The optical axis of the component 12 is therefore perpendicular to the axis of the drilled through-hole 45 or 46, which is identical to the axis of the ferrule holder 16. The light emitted vertically upward by the component 12 must therefore be deflected orthogonally into the drilled through-hole and also be focused at the same time. In the exemplary embodiments of FIGS. 6 and 7, the deflection takes place by a planar mirror surface 48, inclined by 45°, in the deflecting space. The focusing is achieved either by a hemispherical lens 47, the planar bounding surface of which, inclined by 45°, acts at the same time as a reflective surface 48 for rays passing through the lens (FIG. 6), or by a spherical lens 13 which is arranged at the entry of the drilled through-hole 45 and interacts with a separate mirror surface 48 (FIG. 7). Another possibility is for the planar mirror surface to be replaced by a parabolic mirror surface 50 (FIG. 8). The parabolic mirror surface 50 achieves a deflecting and focusing effect simultaneously.

It goes without saying that the invention can be used both in the case of actively light-emitting components (VCSELs, LEDs etc.) and in the case of passively light-receiving components (photodiodes, phototransistors etc.). Equally, apart from the LC plugs or LX.5 plugs, other standardized types of plug (for example E-2000, F-3000, SC, ST etc.) can also be used. Equally, it is conceivable within the scope of the invention to connect two optoelectronic components arranged next to each other to a duplex plug connection, or to connect arrays of more than two components by means of plug connectors in which a correspondingly large number of plug connector inserts of the type represented in FIG. 3 are combined to form a multiple plug connector.

The invention claimed is:

1. A connector for the detachable connection of at least one optical waveguide to at least one optoelectronic component which is arranged and electrically contacted as a chip on the surface of a support which is a circuit board, and which has an optical axis perpendicular to the support, wherein:
   the optical waveguide includes a fiber-optic plug connector; and
   the connector includes a base part which is fastened on the surface of the support surrounding the optoelectronic component, whereby the base part only partially covers the surface of the support, and which has a through-hole for optical signals to be exchanged between the optoelectronic component and the optical waveguide and a coupling part which is a modular part and is exclusively mounted to the base part facing outward and which has an insertion opening and a passage for the releasable insertion of the fiber-optic plug connector, wherein the base part can be connected on one side to the coupling part and has on another side an adapter with which the base part can be placed onto the circuit board.

2. The connector of claim 1, wherein the base part comprises a plate which extends transversely to the direction of insertion of the fiber-optic plug.

3. The connector of claim 2, wherein the fiber-optic plug connector includes:
   a ferrule in which the optical waveguide ends; and
   a ferrule holder for receiving the ferrule when the plug connector is inserted on the base part, the ferrule holder provided on the side of the plate opposite the adapter, whereupon the through-hole opens out into the ferrule holder.

4. The connector of claim 3, wherein the ferrule holder protrudes into the coupling part.

5. The connector of claim 3, wherein the adapter and the ferrule holder are part of a one-piece insert which is inserted into the plate on the base part.

6. The connector of claim 5, wherein:
   the insert is produced from metal, and
   the plate is produced from plastic.

7. The connector of claim 5, wherein the insert and the plate are united in a one-piece element and produced from a plastic.

8. The connector of claim 5, wherein the through-hole is positioned inside the insert between the adapter and the ferrule holder.

9. The connector of claim 5, further including means for focusing light rays passing between the optoelectronic component and the optical waveguide arranged in the insert.

10. The connector of claim 9, wherein the focusing means includes a lens.

11. The connector of claim 10, wherein the lens is arranged at the entry of the drilled through-hole.

12. The connector of claim 9, wherein the focusing means includes a focusing reflective surface.

13. The connector of claim 2, wherein:
   the plate of the base part is arranged parallel to the support; and
   the through-hole and the insertion opening run in the direction of the optical axis of the optoelectronic component.

14. The connector of claim 13, wherein the adapter is formed in a hollow-cylindrical manner.

15. The connector of claim 2, wherein:
   the plate of the base part is arranged perpendicular to the support;
   the through-hole and the insertion opening run parallel to the support; and
   the connector further includes means for the orthogonal deflection of the light rays passing between the optoelectronic component and the optical waveguide in the adapter.

16. The connector of claim 15, wherein the deflecting means includes a hemispherical lens which simultaneously deflects and focuses the light rays.

17. The connector of claim 15, wherein the deflecting means includes a planar reflective surface.

18. The connector of claim 15, wherein the deflecting means includes a focusing reflective surface.

19. The connector of claim 1, wherein the optoelectronic component is a Vertical Surface Cavity Emitting Laser (VCSEL).

* * * * *